United States Patent [19]

Frye

[11] 4,324,839

[45] Apr. 13, 1982

[54] SILICONE RESIN COATING COMPOSITION

[75] Inventor: Robert B. Frye, Menands, N.Y.

[73] Assignee: General Electric Company, Waterford, N.Y.

[21] Appl. No.: 241,653

[22] Filed: Mar. 9, 1981

Related U.S. Application Data

[62] Division of Ser. No. 964,911, Nov. 30, 1978, Pat. No. 4,277,287.

[51] Int. Cl.³ .................. B32B 27/36; B32B 9/04
[52] U.S. Cl. ............................ 428/412; 428/446; 428/447; 428/451; 428/463; 428/450
[58] Field of Search ............ 428/447, 446, 412, 451, 428/450, 463; 106/287.12; 260/29.2 M

[56] References Cited

U.S. PATENT DOCUMENTS

| | | | |
|---|---|---|---|
| 3,629,165 | 12/1971 | Holdstock | 521/83 |
| 3,976,497 | 8/1976 | Clark | 106/287.16 |
| 3,986,997 | 10/1976 | Clark | 260/29.2 N |
| 4,246,423 | 1/1981 | Martin | 427/387 |
| 4,273,698 | 7/1981 | Smith, Jr. | 428/450 |
| 4,284,685 | 8/1981 | Olson et al. | 428/447 |

*Primary Examiner*—George F. Lesmes
*Assistant Examiner*—E. Rollins Buffalow
*Attorney, Agent, or Firm*—Hedman, Casella, Gibson & Costigan

[57] ABSTRACT

An improved silicone resin coating composition is provided, the composition comprising a dispersion of colloidal silica in an aliphatic alcohol-water solution of the partial condensate of a silanol with a small amount of a polysiloxane polyether copolymer added thereto.

15 Claims, No Drawings

SILICONE RESIN COATING COMPOSITION

This is a division of application Ser. No. 964,911, filed Nov. 30, 1978, now U.S. Pat. No. 4,277,287.

BACKGROUND OF THE INVENTION

This invention relates to an improved protective coating composition. More particularly, it relates to a silicone resin coating composition which, when applied to a substrate, forms a protective abrasion-resistant coating thereon.

Recently, the substitution of glass glazing with transparent materials which do not shatter or are more resistant to shattering than glass, has become widespread. For example, transparent glazing made from synthetic organic polymers is now utilized in public transportation vehicles, such as trains, buses, taxis and airplanes. Lenses, such as for eyeglasses and other optical instruments, as well as glazing for large buildings, also employ shatter-resistant transparent plastics. The lighter weight of these plastics in comparison to glass is a further advantage, especially in the transportation industry where the weight of the vehicle is a major factor in its fuel economy.

While transparent plastics provide the major advantage of being more resistant to shattering than glass, a serious drawback lies in the ease with which these plastics mar and scratch, due to everyday contact with abrasives, such as dust, cleaning equipment and ordinary weathering. Continuous scratching and marring results in impaired visibility and poor aesthetics, and oftentimes requires replacement of the glazing or lens or the like.

One of the most promising and widely used transparent plastics for glazing is polycarbonate, such as that known as Lexan ®, sold by General Electric Company. It is a tough material, having high impact strength, high heat deflection temperature, good dimensional stability, as well as being self-extinguishing, and is easily fabricated.

Attempts have been made to improve the abrasion resistance of transparent plastics. For example, scratch-resistant coatings formed from mixtures of silica, such as colloidal silica or silica gel, and hydrolyzable silanes in a hydrolysis medium, such as alcohol and water, are known. U.S. Pat. Nos. 3,708,225, 3,986,997 and 3,976,497, for example, describe such compositions.

Copending U.S. application entitled "Silicone Resin Coating Composition," by Howard A. Vaughn (Ser. No. 964,910, filed Nov. 30, 1978, discloses another abrasion-resistant coating composition. This coating composition has been found to be highly desirable as a protective finish for plastic, as well as metal or metallized substrates. A particularly significant area of application for this Vaughn coating is in the glazing and optical lens industry. Since these areas require a coating of high optical clarity, coatings which show flowmarks, dirtmarks or other marks which may impair visibility are undesirable. It has been surprisingly discovered herein that the addition of a small amount of a polysiloxane polyether copolymer to the coating compositions disclosed in the afore-mentioned Vaughn application eliminates the occurrence of the undesirable flowmarks and the like, as well as providing other improvements in the hard coating which will be discussed in detail hereinafter.

SUMMARY OF THE INVENTION

Accordingly, it is one object of the present invention to provide an improved silicone resin coating composition for solid substrates.

Another object of this invention is to provide a silicone resin coating composition for solid substrates which, when applied, provides an abrasion resistant surface thereto.

Still another object of this invention is to provide a silicone resin coating composition which is especially well suited for transparent plastics.

A further object of this invention is to provide a silicone resin coating composition which, when applied to a transparent plastic, does not impair the optical clarity thereof.

A still further object of this invention is to provide a silicone resin coating compositon which, when applied to a solid substrate, not only provides an abrasion resistant coating thereto but also provides a coating with increased resistance to stress cracking.

These and other objects are accomplished herein by an improved coating composition comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, at least 70 weight percent of the silanol being $CH_3Si(OH)_3$, said composition containing 10 to 50 weight percent solids, said solids consisting essentially of 10 to 70 weight percent colloidal silica and 30 to 90 weight percent of the partial condensate, said composition having a pH of from 7.1 to about 7.8, the improvement comprising the intimate admixture of a small amount of a polysiloxane polyether copolymer to said composition.

DETAILED DESCRIPTION OF THE INVENTION

The coating compositions of this invention are prepared by hydrolyzing an alkyltrialkoxysilane or aryltrialkoxysilane of the formula $RSi(OR)_3$, wherein R is alkyl of from 1 to 3 carbons or aryl, such as phenyl, in an aqueous dispersion of colloidal silica, and intimately admixing a polysiloxane polyether copolymer with the resultant reaction product.

In the practice of the present invention, suitable aqueous colloidal silica dispersions generally have a particle size of from 5 to 150 millimicrons in diameter. These silica dispersions are well known in the art and commercially available ones include, for example, those sold under the trademarks of Ludox (duPont) and Nalcoag (NALCO Chemical Co.). Such colloidal silicas are available as both acidic and basic hydrosols. For the purposes of this invention, wherein the pH of the coating compositions is on the basic side, basic colloidal silica sols are preferred. However, acidic colloidal silicas, wherein the pH is adjusted to a basic level, are also contemplated. In addition, it has been found that colloidal silicas having a low alkali content (e.g., $Na_2O$) yield a more stable coating composition. Thus, colloidal silica having an alkali content of less than 0.35% (calculated as $Na_2O$) are preferred. Moreover, colloidal silicas having average particle size of from 10 to 30 millimicrons are also preferred. A particularly preferred one for the purposes herein is known as Ludox LS, sold by duPont Company.

In accordance with this invention, the aqueous colloidal silica dispersion is added to a solution of a small amount of alkyltriacetoxysilane in alkyltrialkoxysilane or aryltrialkoxysilane. The temperature of the reaction mixture is maintained at about 20° C. to about 40° C. and preferably below 25° C. It has been found that in about six to eight hours sufficient trialkoxysilane has reacted to reduce the initial two-phase liquid mixture to one liquid phase in which the now treated silica (i.e., treated by admixture with the trialkoxysilane) is dispersed. In general, the hydrolysis reaction is allowed to continue for a total of about 24 hours to 48 hours, depending upon the desired viscosity of the final product. The more time the hydrolysis reaction is permitted to continue, the higher will be the viscosity of the product. After hydrolysis has been completed, the solids content is adjusted by the addition of alcohol, preferably isobutanol, to the reaction mixture. Other suitable alcohols for this purpose include lower aliphatic alcohols such as methanol, ethanol, propanol, isopropanol, n-butyl alcohol and t-butyl alcohol. Mixtures of such alcohols can be used, too. The solvent system should contain from about 20 to 75 weight percent alcohol to ensure solubility of the partial condensate (siloxanol). Optionally, additional water-miscible polar solvents, such as acetone, butylcellosolve and the like in minor amounts, like no more than 20 weight percent of the cosolvent system, can also be employed. The solids content of the coating composition of this invention is generally preferred to be in the range of from about 18 to 25%, most preferably about 20%, by weight of the total composition. The pH of the resultant coating composition is in the range of from about 7.1 to about 7.8, preferably higher than 7.2. If necessary, dilute base, such as ammonium hydroxide, or weak acid, such as acetic acid, may be added to the composition to adjust the final pH to this desired range.

It has been found herein that it is advantageous to include a polysiloxane polyether copolymer in the coating composition. This polysiloxane polyether copolymer may be added to the composition after the hydrolysis is completed. Preferably, however, it is added to the composition after the initial solids content has been diluted with alcohol. The polysiloxane polyether copolymer acts as a flow control agent and thereby prevents flowmarks, dirtmarks, and the like, on the surface of the substrate to which the coating is subsequently applied. For the purposes of this invention, the polysiloxane polyether copolymer is employed in an amount of from about 2.5 to about 15% by weight of the total solids of the composition. Most advantageous results are achieved when the copolymer is utilized at about 4% by weight of the total solids. At these amounts, the polysiloxane polyether copolymer prevents marks on the substrate which impair visibility or are aesthetically detracting and has no significant deleterious effects on the otherwise good abrasion resistance, scribed adhesion, ultraviolet light resistance, moisture and humidity resistance of the coating. Moreover, the presence of the polysiloxane polyether copolymer additive has been found to reduce the incidence of stress cracking in the hard coating.

Although the polysiloxane polyether copolymer slightly raises the viscosity of the coating composition, it does not accelerate the rate of viscosity increase with age of the composition, nor does it shorten the shelf-life of the composition. The polysiloxane polyether copolymer is completely compatible with the alcohol-water cosolvent system of the compositions herein and becomes a permanent part of the cured coating, not removed by washing, even with soap and water.

More specifically, some of the polysiloxane polyether copolymers useful in the practice of the invention herein are liquid organopolysiloxane copolymers having the formula:

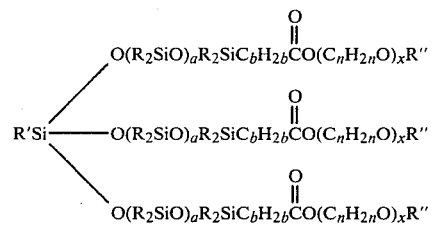

where R and R' are monovalent hydrocarbon radicals; R" is a lower alkyl radical; a has a value of at least 2, e.g., from about 2 to 40 or more; b has a value of from 2 to 3, n has a value of from 2 to 4 and x has a value of at least 5, e.g., from 5 to 100 or more.

Among the radicals represented by R and R' in the above formula can be mentioned, for example, alkyl radicals, e.g., methyl, ethyl, propyl, butyl, octyl, etc.; cycloalkyl radicals, e.g., cyclohexyl, cycloheptyl, etc.; aryl radicals, e.g., phenyl, tolyl, naphthyl, xylyl, etc.; aralkyl, e.g., benzyl, phenylethyl, etc., alkenyl and cycloalkenyl, e.g., vinyl, allyl, cyclohexenyl, etc.; and halogenated radicals of the aforementioned type, e.g., chloromethyl, chlorophenyl, dibromophenyl, etc. R" is lower alkyl, e.g., an alkyl radical containing from 1 to about 7 carbon atoms, such as methyl, ethyl, propyl, butyl, isobutyl, amyl, etc. The preparation and description of these polysiloxane polyether copolymers is disclosed in U.S. Pat. No. 3,629,165, which is incorporated herein by reference. In the above formula R is preferably methyl, R' is preferably methyl, R" is preferably butyl, a is preferably 4, b is preferably 3, n is preferably 2.4, and x is preferably 28.5. Particularly suitable polysiloxane polyether copolymers for the purpose of this invention include the materials known as SF-1066 and SF-1141, both sold by General Electric Company, BYK-300, sold by Mallinckrodt, L-540, sold by Union Carbide, and DC-190, sold by Dow Corning.

The arkyltriacetoxysilane is used to buffer the basicity of the initial two liquid phase reaction mixture and thereby also temper the hydrolysis rate. While the use of alkyltriacetoxysilane is preferred herein, glacial acetic acid may be used in its place, as well as other acids such as organic acids like propionic, butyric, citric, benzoic, formic, oxalic, and the like. Alkyltriacetoxysilanes wherein the alkyl group contains from 1–6 carbon atoms can be used, alkyl groups having from 1 to 3 carbon atoms being preferred. Methyltriacetoxysilane is most preferred.

The silanetriols RSi(OH)$_3$, hereinbefore mentioned, are formed in situ as a result of the admixture of the corresponding trialkoxysilanes with the aqueous medium, i.e., the aqueous dispersion of colloidal silica. Exemplary trialkoxysilanes are those containing methoxy, ethoxy, isopropoxy and n-butoxy substituents which upon hydrolysis generate the silanetriols and further liberate the corresponding alcohol. In this way, at least a portion of the alcohol content present in the final coating composition is provided. Upon the generation of the hydroxyl substituents to form

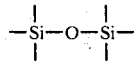

bonding occurs. This condensation takes place over a period of time and is not exhaustive but rather the siloxane retains an appreciable quantity of silicon-bonded hydroxyl groups which render the polymer soluble in the alcohol-water cosolvent. This soluble partial condensate can be characterized as a siloxanol polymer having at least one silicon-bonded hydroxyl group per every three

units.

The non-volatile solids portion of the coating composition herein is a mixture of colloidal silica and the partial condensate (or siloxanol) of a silanol. The major portion or all of the partial condensate or siloxanol is obtained from the condensation of $CH_3Si(OH)_3$ and, depending upon the input of ingredients to the hydrolysis reaction, minor portions of partial condensate can be obtained, for example, from the concentration of $CH_3Si(OH)_3$ with $C_2H_5Si(OH)_3$ or $C_3H_7Si(OH)_3$; $CH_3Si(OH)_3$ with $C_6H_5Si(OH)_3$, or even mixtures of the foregoing. For optimum results in the cured coating it is preferred to use all methyltrimethoxysilane (thus generating all monomethylsilanetriol) in preparing the coating compositions herein. In the preferred coating compositions herein the partial condensate is present in an amount of from about 55 to 75 weight percent of the total solids in a cosolvent of alcohol and water, the alcohol comprising from about 50% to 95% by weight of the cosolvent.

The coating compositions of this invention will cure on a substrate at temperatures of, for example, 120° C. without the aid of an added curing catalyst. However, in order to employ more desirable milder curing conditions, buffered latent condensation catalysts can be added. Included in this class of catalysts are alkali metal salts of carboxylic acids, such as sodium acetate, potassium formate and the like. Amine carboxylates, such as dimethylamine acetate, ethanolamine acetate, dimethylaniline formate and the like, quaternary ammonium carboxylates such as tetramethylammonium acetate, benzyltrimethylammonium acetate, metal carboxylates, like tin octoate and amines such as triethylamine, triethanolamine, pyridine and the like are also contemplated curing catalysts herein. Alkali hydroxides, like sodium hydroxide and ammonium hydroxide can also be used as curing catalysts herein. Moreover, typical commercially available colloidal silica, especially those having a basic pH, contain free alkali metal base and alkali metal carboxylate catalysts will be generated in situ during the hydrolysis reaction herein.

The amount of curing catalyst can be varied within a wide range, depending upon the desired curing conditions. However, in general, catalyst in the amounts of from about 0.05 to about 0.5 weight percent, preferably about 0.1 weight percent, of the composition can be used. Compositions containing catalysts in these amounts can be cured on a solid substrate in a relatively short time at temperatures in the range of from about 75°–150° C. to provide a transparent abrasion resistant surface coating.

The coating compositions of the present invention can be applied to a variety of solid substrates by conventional methods, such as flowing or dipping, to form a continuous surface film. Substrates which are especially contemplated herein are transparent and non-transparent plastics and metals. More particularly, these plastics are synthetic organic polymeric substrates such as acrylic polymers, like poly(methylmethacrylate), polyesters, such as poly(ethylene terephthalate), poly(butylene terephthalate), etc., polyamides, polyimides, acrylonitrile-styrene copolymers, styrene-acrylonitrile-butadiene copolymers, polyvinyl chloride, butyrates, polyethylene and the like. As noted above, the coating compositions of this invention are especially useful as coatings for polycarbonates, such as those polycarbonates known as Lexan ®, sold by General Electric Company. The metal substrates on which the present protective coatings are utilized include bright and dull metals like aluminum and bright metallized surfaces like sputtered chromium alloy. Other solid substrates contemplated herein include wood, painted surfaces, leather, glass, ceramics and textiles.

By choice of the proper formulation, application conditions and pretreatment, including the use of primers, of the substrate, the coatings can be adhered to substantially all solid substrates. A hard coating having all of the afore-mentioned characteristics and advantages is obtained by the removal of the solvent and volatile materials. The coating composition will air-dry to a tack-free condition, but heating in the range of 75° C. to 200° C. is necessary to obtain condensation of residual silanols in the partial condensate. This final cure results in the formation of silsequioxane $(RSiO_{3/2})$. In the finished cured coating the ratio of $RSiO_{3/2}$ units to $SiO_2$ will range from about 0.43 to about 9.0, preferably 1 to 3. A cured coating having a ratio of $RSiO_{3/2}$ to $SiO_2$, when R is methyl, of 2 is most preferred. The coating thickness can be varied by means of the particular application technique but coatings of about 0.5 to 20 microns, preferably 2–10 micron thickness are generally utilized.

In order that those skilled in the art may better understand how to practice the present invention, the following examples are given by way of illustration and not by way of limitation.

EXAMPLE 1

22.1 parts by weight of Ludox LS, silica sol (aqueous dispersion of colloidal silica, average particle size is 12 millimicrons, pH of 8.2 sold by duPont) is added to a solution of 0.1 parts by weight of methyltriacetoxysilane in 26.8 parts by weight of methyltrimethoxysilane. The temperature of the reaction mixture is maintained at 20° C. to 30° C., preferably below 25° C. The hydrolysis is allowed to continue for 24 hours. The solids content of the resultant reaction mixture is 40.5% and is diluted to about 20% solids with the addition of isobutanol. One gram (5% of solids) of SF-1066 (polysiloxane polyether copolymer, sold by G. E.) is thoroughly mixed with 99 grams of the resultant composition. The final composition has a pH of higher than 7.2.

This coating composition is flow-coated onto a 6" by 8" transparent Lexan ® poly(bisphenol-A carbonate)) panel primed with a thermosetting acrylic emulsion.

After air drying for 30 minutes the panel is cured for 1 hour at 120° C. The resultant hard coating is smooth and clear and has no evidence of flowmarks or stress cracking. After 500 Taber Abraser cycles (500 g load, CS-10F wheels) (ANSI-Z26.1-1977 section 5.17) the change in percent haze (Δ%H) is 2.0. In contrast, when the same coating composition but not containing the SF-1066 additive, is flow-coated on the same Lexan ® panel, after 500 Taber cycles, the change in percent haze is 2.6 and the topcoat has clearly visible flowmarks.

EXAMPLE 2

22.1 parts by weight of Ludox LS, silica sol (aqueous dispersion of colloidal silica, average particle size is 12 millimicrons, pH of 8.2 sold by duPont) is added to a solution of 0.1 parts by weight of methyltriacetoxysilane in 26.8 parts by weight of methyltrimethoxysilane. The temperature of the reaction mixture is maintained at 20° C. to 30° C., preferably below 25° C. The hydrolysis is allowed to continue for 24 hours. The solids content of the resultant reaction mixture is 40.5% and is diluted to about 20% solids with the addition of isobutanol. One gram (5% of solids) of BYK-300 (polysiloxane polyether copolymer, available from Mallinckrodt) is thoroughly mixed with 99 grams of the resultant composition. The final composition has a pH of higher than 7.2.

This coating composition is flow-coated onto a transparent Lexan ® panel primed with a thermosetting acrylic emulsion. After air drying for 30 minutes the panel is cured for 1 hour at 120° C. The resultant hard coating is smooth and clear and has no evidence of flowmarks or stress cracking. After 500 Taber Abraser cycles (500 g load, CS-10F wheels) the change in percent haze (Δ%H) is 2.0.

EXAMPLE 3

22.1 parts by weight of Ludox LS, silica sol (aqueous dispersion of colloidal silica, average particle size is 12 millimicrons, pH of 8.2 sold by duPont) is added to a solution of 0.1 parts by weight of methyltriacetoxysilane in 26.8 parts by weight of methyltrimethoxysilane. The temperature of the reaction mixture is maintained at 20° C. to 30° C., preferably below 25° C. The hydrolysis is allowed to continue for 24 hours. The solids content of the resultant reaction mixture is 40.5% and is diluted to about 20% solids with the addition of isobutanol. 0.8 grams (4% of solids) of SF-1066 (polysiloxane polyether copolymer, sold by G. E.) is thoroughly mixed with 99.2 grams of the resultant composition. The final composition has a pH of higher than 7.2.

This coating composition is flow-coated onto a 6" by 8" transparent Lexan ® (poly(bisphenol-A carbonate) panel primed with a thermosetting acrylic emulsion. After air drying for 30 minutes the panel is cured for 1 hour at 120° C. The resultant hard coating is smooth and clear and has no evidence of flowmarks or stress cracking. After 500 Taber Abraser cycles (500 g load, CS-10F wheels) the change in percent haze (Δ%H) is 1.1.

Obviously, other modifications and variations of the present invention are possible in the light of the above teachings. It is therefore to be understood that changes may be made in the particular embodiments described above which are within the full intended scope of the invention as defined in the appended claims.

I claim:

1. A solid substrate having at least one surface coated with an improved aqueous coating composition comprising a dispersion of colloidal silica in an aliphatic alcohol-water solution of the partial condensate of a silanol of the formula RSi(OH)$_3$ wherein R is selected from the group consisting of alkyl having from 1 to 3 carbon atoms and aryl, at least 70 weight percent of the silanol being CH$_3$Si(OH)$_3$, said composition containing 10 to 50 weight percent solids, said solids consisting essentially of 10 to 70 weight percent colloidal silica and 30 to 90 weight percent of the partial condensate, said composition having a pH of from 7.1 to about 7.8, wherein the improvement comprises the intimate admixture of a small amount effective to control flow of a polysiloxane polyether copolymer with said composition.

2. A solid substrate having at least one surface coated with an improved aqueous coating composition as defined in claim 1 wherein said polysiloxane polyether copolymer has the structural formula:

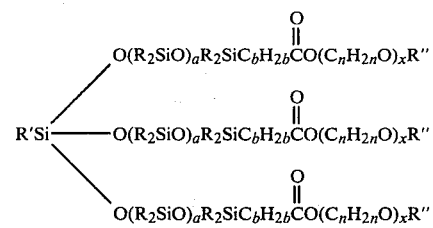

wherein R and R' are monovalent hydrocarbon radicals; R" is a lower alkyl radical, a has a value of at least 2; b has a value of from 2 to 3, inclusive, n has a value of from 2 to 4, inclusive, and x has a value of at least 5.

3. An article as defined in claim 2 wherein the solid substrate is comprised of a synthetic organic polymer.

4. An article as defined in claim 2 wherein said solid substrate is a metal.

5. An article as defined in claim 2 wherein said solid substrate is a synthetic organic polymer having a metallized surface.

6. An article as defined in claim 3 wherein the polymeric substrate is transparent.

7. An article as defined in claim 3 wherein said polymer is a polycarbonate.

8. An article as defined in claim 7 wherein said polycarbonate is transparent.

9. An article as defined in claim 7 wherein said polycarbonate is a transparent poly(bisphenol-A carbonate).

10. An article as defined in claim 1 wherein the aqueous coating composition has been cured on said surface of said solid substrate.

11. An article as defined in claim 2 wherein the aqueous coating composition has been cured on said surface of said solid substrate.

12. An article as defined in claim 1 wherein said surface of said solid substrate has been primed with a primer composition prior to having been coated with said improved aqueous coating composition.

13. An article as defined in claim 12 wherein said primer composition comprises a thermosetting acrylic emulsion.

14. An article as defined in claim 2 wherein said surface of said solid substrate has been primed with a primer composition prior to having been coated with the improved aqueous coating composition of claim 1.

15. An article as defined in claim 14 wherein said primer composition comprises a thermosetting acrylic emulsion.

* * * * *

Disclaimer 4,324,839.—*Robert B. Frye*, Menands, N.Y. SILICONE RESIN COATING COMPOSITION. Patent dated Apr. 13, 1982. Disclaimer filed Aug. 24, 1983, by the assignee, *General Electric Co.*

Hereby enters this disclaimer to claims 1 through 11 of said patent.
[*Official Gazette October 4, 1983.*]

Disclaimer 4,324,839.—*Robert B. Frye*, Menands, N.Y. SILICONE RESIN COATING COMPOSITION. Patent dated Apr. 13, 1982. Disclaimer filed Dec. 27, 1983, by the assignee, *General Electric Co.*

The term of this patent subsequent to Dec. 29, 1998, has been disclaimed.

[*Official Gazette March 20, 1984.*]